May 7, 1929. H. L. F. TREBERT 1,712,316
HYDRAULIC BRAKE
Filed Dec. 16, 1925 2 Sheets-Sheet 1
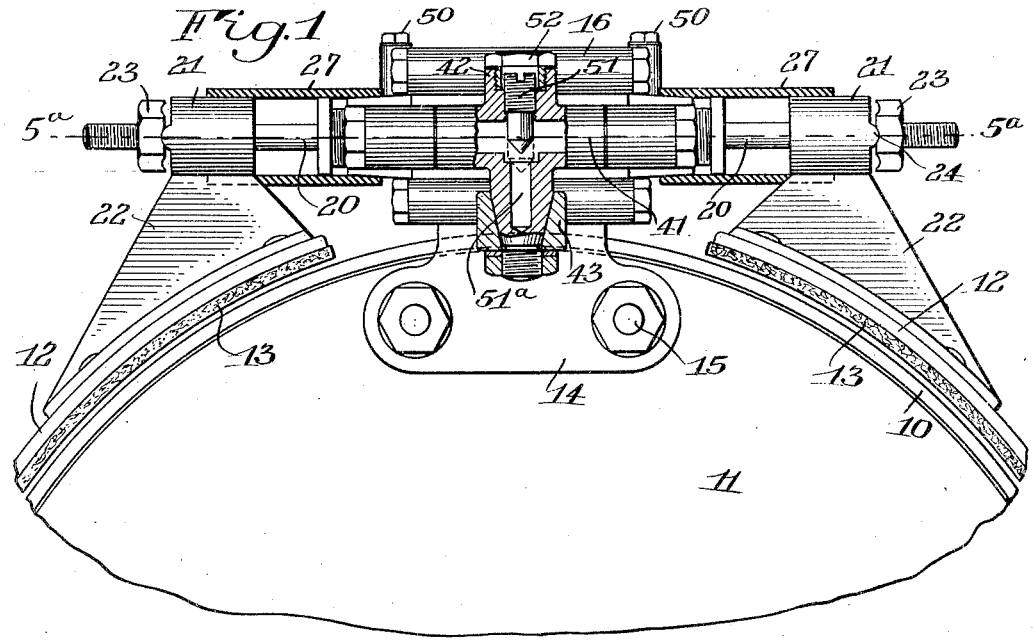
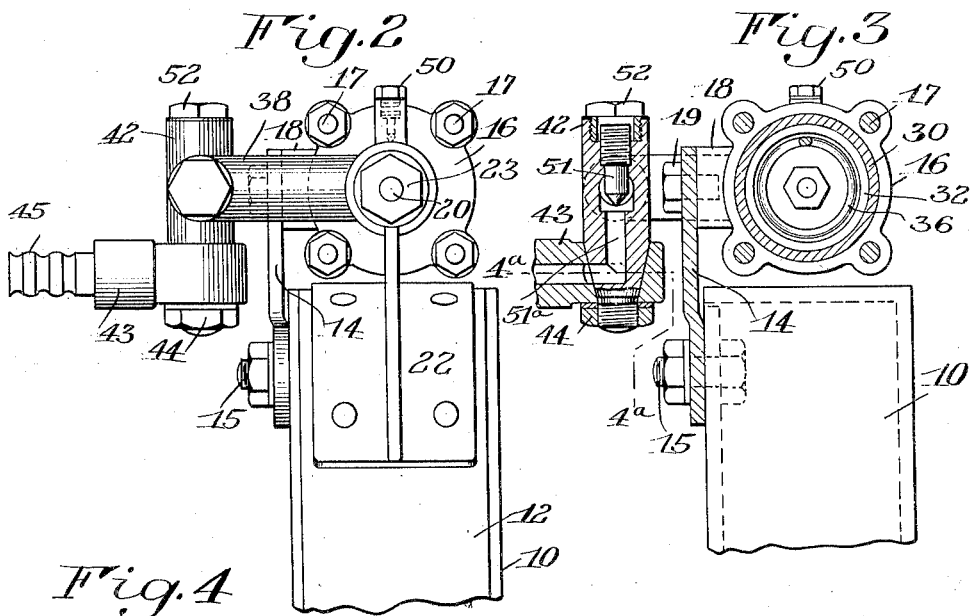
INVENTOR
Henry L. F. Trebert
BY
his ATTORNEYS May 7, 1929.  H. L. F. TREBERT  1,712,316
HYDRAULIC BRAKE
Filed Dec. 16, 1925   2 Sheets-Sheet 2
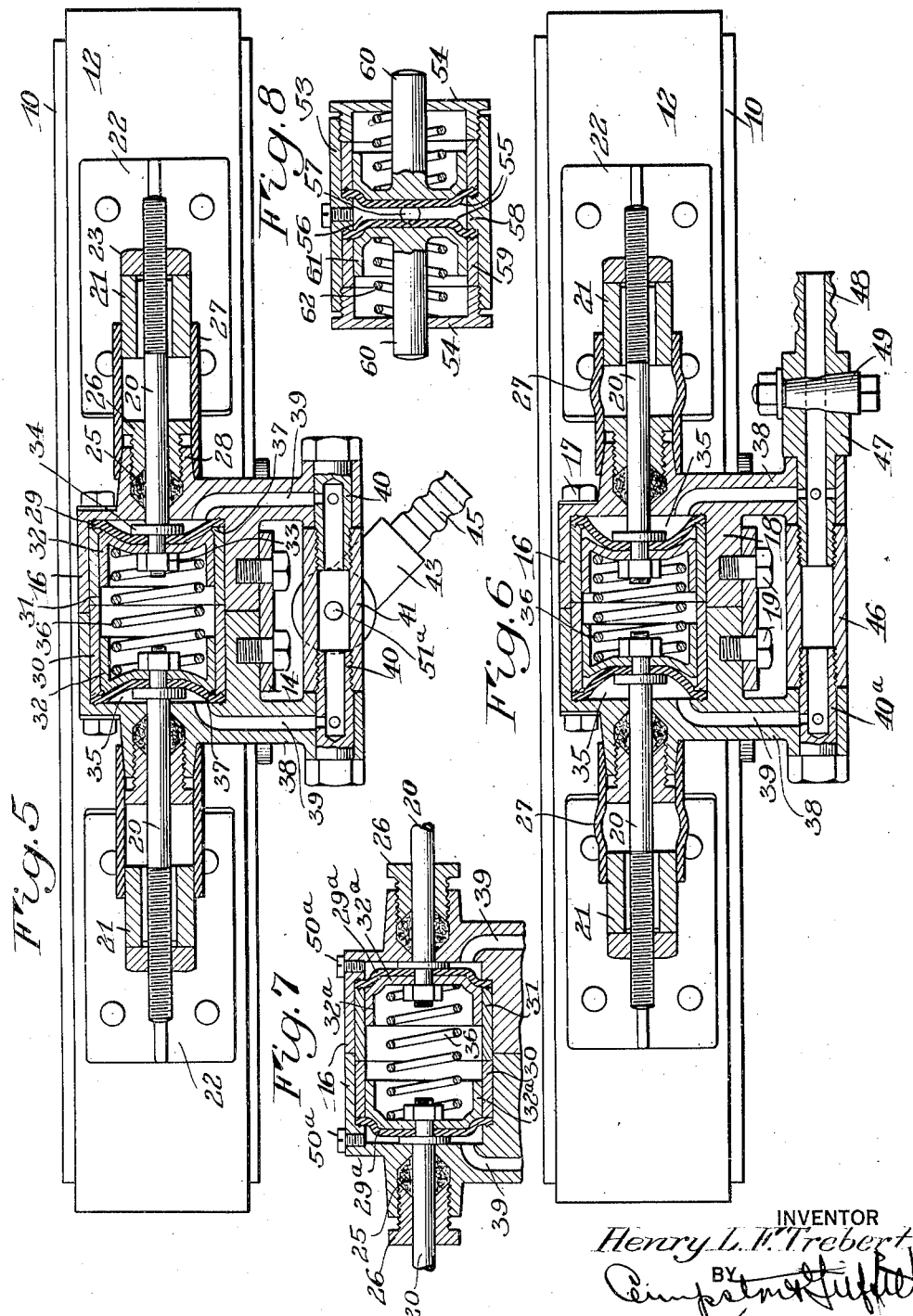
INVENTOR
Henry L. F. Trebert
BY
his ATTORNEYS

Patented May 7, 1929.

1,712,316

UNITED STATES PATENT OFFICE.

HENRY L. F. TREBERT, OF CANANDAIGUA, NEW YORK.

HYDRAULIC BRAKE.

Application filed December 16, 1925. Serial No. 75,687.

The present invention relates to brake mechanisms, and, more particularly, to hydraulic or fluid pressure brake systems, one object being to provide improved operating means for brakes of this type embodying a simple, compact construction which is efficient in operation and comparatively inexpensive to manufacture.

Another object of the invention is to provide a brake operating mechanism embodying the use of diaphragms or flexible walls of any preferred type or form of construction adapted to be operated by fluid under pressure, and particularly designed for the operation of motor vehicle brakes, such as the front and rear wheel brakes of an automobile.

A further object of the invention is to provide a motor vehicle brake system of the hydraulic type with improvements whereby any single brake or set of brakes which for any reason may become disabled or ineffective in operation can be quickly cut out without effecting the successful operation of the remaining brakes of the system.

To these and other ends the invention resides in certain improvements and combinations of parts, all as will be hereinafter more fully described, the novel features being pointed out in the claims at the end of the specification.

In the drawings:—

Figure 1 is a part sectional elevation of the improved brake operating mechanism as applied to a brake drum;

Figure 2 is an end elevation of the operating mechanism shown in Figure 1;

Figure 3 is a transverse sectional elevation taken centrally of Figure 1;

Figure 4 is a detail sectional view taken on line 4ª—4ª of Figure 3;

Figure 5 is a longitudinal sectional plan taken on line 5ª—5ª of Figure 1 with the brake in release position;

Figure 6 is a similar view with the brake applied showing a modified conduit connection;

Figure 7 is a sectional plan embodying a slight modification of the invention, and Figure 8 is a sectional plan of still another modification.

Similar reference numerals throughout the several views indicate the same parts.

Heretofore in hydraulic or fluid pressure brakes the actuating elements have been in the form of pistons operating in cylinders, the objection to which is that it is difficult to maintain the pistons fluid tight due to the constant wear to which these parts are subjected. The advantage of the present diaphragm or flexible operating wall construction is due to the fact that it is entirely leak proof and further advantages lie in the fact that it is cheaper to construct, occupies less room and is more reliable in operation.

The invention embodies an additional improvement in motor driven braking systems of the hydraulic type which comprises means by which any one of the brakes upon becoming disabled may be cut out without effecting the operation of the remaining brakes. In hydraulic brake systems now in use should one of the brakes become inoperative the entire system is rendered ineffective.

The invention, while shown applied to the brake drums of a motor driven vehicle, is readily applicable to various kinds of power driven machines requiring some form of brake mechanism for retarding the movement of the driving or driven parts thereof.

Referring to the drawings, 10 represents a revoluble power driven element, preferably a brake drum, such as is commonly employed on the wheels of motor driven vehicles, and 11 represents a disk or drum closure element of well known construction which is usually carried by the axle or axle housing of the vehicle. A brake band of any suitable construction is indicated, generally, at 12, and may be supported intermediate its ends in a well known manner. The band includes the usual brake lining members as indicated at 13, the band proper being made in one or two pieces as desired. The present brake operating device may be supported between the ends of the band in any desired manner, but is preferably carried by a plate or bracket 14 rigidly secured at the inner side of the upper edge of the drum by bolts 15 extended through the drum closure 11 as indicated in Figure 3.

A casing or housing for the brake operating parts is indicated, generally, at 16, and is preferably in the form of two similarly constructed castings bored to the desired diameter and tightly clamped together by a series of longitudinally extending bolts 17 as shown in Figures 2 and 3. The sections of the casing are also tied together by the supporting plate or bracket 14 connected with the extended wall portions 18 of the sections by the stud bolts 19 as shown in Figures 3 and 5.

Extending through the end walls of the housing in opposite directions are a pair of brake operating rods 20 which are preferably projected loosely through the cylindrical lugs 21 of the upstanding arms or brackets 22 rigidly secured on the free ends of the brake band as shown in Figure 1. The rods are provided preferably with self-locking nuts 23 having a series of indentations on their inner faces adapted to receive the rounded projections 24 of the lugs 21 whereby loosening of the nuts through vibration of the parts is prevented, it being understood, however, that other suitable rod securing means may be provided if desired. Leakage of the braking fluid around the rods and through the end walls of the casing is prevented by suitable packing material 25 which is tightly compressed by the usual packing nuts 26 as shown in Figure 5. Flexible coverings 27 interposed between the cylindrical lugs 21 and the annular projections 28 on the casing serve to prevent the accumulation of dirt or dust on the parts therein.

Disposed within the casing at each end thereof is a flexible disk, wall or diaphragm 29 constructed of steel, rubber, or any flexible or yieldable material suitable for the purpose. The diaphragms are preferably secured by having their peripheral edge portions firmly clamped against the end walls of the casing through the medium of the relatively long and short sleeves or annular rings 30 and 31 which are of sufficient length overall to slightly compress the material of the diaphragms upon tightly drawing the casing sections together by means of the clamping bolts 17. The ring 30 overlaps the joint between the casing sections and tightly closes the same. The inner ends of the operating rods 20 may be connected with the flexible walls or diaphragms in any desired manner but are preferably extended therethrough and also through followers 32 which are clamped upon the inner faces of the diaphragms by nuts 33 acting in opposition to the collars 34 on the rods, the collars engaging the central portions of the diaphragms and serving to prevent escape of the operating fluid from the pressure chambers 35. A spring 36 is interposed between the followers 32 and is adapted to return the diaphragms to brake release position upon relieving the pressure within the chambers 35. The rings 30 and 31 are provided at their outer ends with rounded annular portions 37 which serve as stops for limiting the outward movement of the followers and which also serve to prevent cutting of the diaphragms when the latter are moved inwardly by the pressure of the fluid, this being of particular importance in cases where the diaphragms are made of rubber or other relatively soft material. With the diaphragms constructed of material of this kind it will be understood that the same will necessarily be stretched slightly when moved to brake applying position as shown in Figure 6, but where they are made of steel no stretching takes place, the flexibility of the metal being sufficient to take care of the required movement.

Each section of the casing 16 is provided with an inwardly extended tubular portion 38 having a fluid inlet passage 39 leading to the pressure chamber 35, the ends of said tubular portions being provided with alined bores through which are extended hollow bolts 40 threaded into a tubular connection embodying a horizontal portion 41 and a vertical transverse portion 42 tapered at its lower end to receive a tubular extension 43 adjustably held at any desired angle with respect to the member 42 by a clamp nut 44 as shown in Figure 3, the extension 43 being shown in different positions of adjustment in Figures 2 and 5. The several extensions 43 of the different brakes each carries a reduced end portion 45 adapted for the reception of a rubber or other flexible tube not shown, the tubes in turn being connected either with a main fluid supply tank, a master cylinder or any suitable means under the control of the operator of the vehicle whereby pressure may be simultaneously applied to the operating diaphragms to effect application of the brakes whenever desired.

In the operation of the brakes the fluid on entering the extension 43 will pass upwardly into the horizontal portions 41 of the connections and thence through the bolts 40 and the passages 39 to the diaphragm chambers 35 whereby the diaphragms are forced inwardly from the normal position shown in Figure 5 to the operating position shown in Figure 6. When the pressure is relieved in the system the springs 36 serve to return the diaphragms to inoperative position and the brakes are thus simultaneously released on all of the wheels.

In the conduit connections shown in Figure 6, the connections 42 and 43 are omitted and likewise one of the bolts 40 and in place thereof a straight tubular connection 46 is interposed between the ends of the casing extensions 38, the same being secured at one end by a tubular bolt 40ª and at the other by a hollow member 47 having a reduced portion 48 for the reception of a rubber or other flexible tube not shown for connecting the brake with the fluid supply source.

The hollow connections 47 are provided with two-way valves 49 which can be conveniently turned by the use of a wrench or other suitable tool to cut out any one of the brakes of the system which for any reason may become disabled or ineffective at any time. This is a simple but highly important arrangement since it enables the machine to be successfully operated by the use of the remaining brakes while heretofore this has not been possible with brake systems of the present type.

The casing 16 is provided at each end with a plug 50 for controlling a vent passage leading from the diaphragm chamber 35.

The vertical tubular connection 42 is provided with a small valve plug 51 threaded in the connection for closing the fluid inlet passage 51ª whereby to stop the flow of the fluid to the diaphragm chambers of any one of the brakes which may become ineffective from time to time, thus permitting the remaining brakes to be operated as explained above. The valve 51 is preferably protected by a screw cap 52, as shown in Figure 3.

The modification shown in Figure 7 is substantially the same as that shown in Figure 5, except that the diaphragms 29ª are dished outwardly instead of inwardly. In cases where they are made of rubber this arrangement avoids stretching of the material under expansion of the liquid, as will be understood from the construction shown. The followers 32ª are, of course, shaped to conform to the diaphragms as indicated. In this modification, the vent plugs 50ª are placed in the sides of the casing 16 instead of on top thereof. The remaining parts of this construction being the same as those of the preferred form, they are given corresponding reference characters.

In the modification shown in Figure 8, a onepiece casing 53 is provided which is closed at its ends by the screw caps 54. The diaphragms, indicated at 55 are disposed adjacent each other to afford a single compression chamber 56 into which the brake fluid is discharged through a port 57 connected in any suitable manner with the main supply cylinder or reservoir of the brake system, not shown. The diaphragms are clamped in position upon the annular wall 58 of the casing by the rings 59 through the medium of the screw caps 54. The operating stems or rods 60 are actuated outwardly instead of inwardly by the diaphragms through the medium of the cylindrically shaped heads or followers 61 with which the stems are preferably cast integral, the springs 62 serving to return the diaphragms to the normal position shown. The rods 60 may be operatively associated with the ends of the brake bands in any well known manner through parts acted upon by the outward movement of the rods, such as bell crank levers or the like, not shown.

The invention while shown in connection with an external brake is readily applicable to an internal brake as well.

I claim as my invention:

1. In a brake mechanism, the combination with a brake drum and a brake band associated therewith, of a casing mounted between the ends of the band, diaphragms within the casing, ring-shaped members adapted to clamp the edges of the diaphragms upon the walls of the casing, followers engaging the diaphragms within the ring-shaped members, a spring interposed between the followers for returning the diaphragms to inoperative position, operating means for the bands adapted to be actuated by the diaphragms, and conduit connections having fluid passages leading to the outer faces of the diaphragms.

2. In a brake mechanism, the combination with a brake drum and a brake band associated therewith, of a casing mounted between the ends of the brake band, spaced diaphragms disposed within the casing, annular members within the casing adapted to engage and clamp the edges of the diaphragms against the walls of the casing, followers engaging the diaphragms within said annular members, a spring interposed between the followers, rods having their outer ends connected with the ends of the brake band and their inner ends extended through the diaphragms and followers and secured to the latter, and tubular connections having passages leading to the outer faces of the diaphragms.

3. In a pressure operated brake mechanism, the combination with a brake drum and a brake band associated therewith, of a casing disposed between the ends of the band comprising a plurality of sections, means adapted to clamp said sections together, flexible disks disposed within the casing having their edges engaging the walls of the latter, means engaging said edges adapted to be clamped thereon by said casing sections, means operatively connecting the disks with said brake band ends, and conduit connections having fluid passages leading to the disks.

4. In a pressure operated brake mechanism, the combination with a brake drum and a brake band associated therewith, of a casing disposed between the ends of the band comprising a plurality of sections, means adapted to clamp said sections together, diaphragms disposed within the casing having their edges engaging the wells of the latter, annular members within the casing engaging said edges and adapted to be clamped thereon by the casing sections, means operatively connecting the diaphragms with the ends of the brake band, means for conveying fluid to the outer faces of the diaphragms, and spring means adapted to return the diaphragms to inoperative position upon relieving the pressure thereon.

5. In a pressure operated brake mechanism, the combination with a brake drum and a brake band associated therewith, of a casing disposed between the ends of the band comprising a pair of connected sections each having a laterally extended portion provided with a fluid passage leading to the interior of the casing, means connecting the ends of said laterally extending portions having a fluid passage communicating with the first mentioned passages, said means being adapted for connection with a fluid supply conduit, diaphragms within the casing, and means operatively connecting the diaphragms with the ends of the brake band.

6. In a pressure operated brake mechanism, the combination with a brake drum and a brake band associated therewith, of a casing disposed between the ends of the band comprising a pair of connected sections each having a laterally extended portion provided with a fluid passage leading to the interior of the casing, means connecting the ends of said laterally extending portions having a fluid passage communicating with the first mentioned passages, said means being adapted for connection with a fluid supply conduit, diaphragms within the casing, means operatively connecting the diaphragms with the ends of the brake band, a valve for closing the second mentioned passage for preventing the flow of the braking fluid to said casing, and means within the casing for returning the diaphragms to inoperative position upon release of the pressure thereon.

7. In a pressure operated brake mechanism, the combination with a brake drum and a brake band associated therewith, of a casing disposed between the ends of the band comprising a pair of connected sections each having a laterally extended portion provided with a fluid passage leading to the interior of the casing, a tubular member disposed between the ends of said laterally extended portions, hollow bolts connecting said tubular member with said extended portions and adapted to establish communication between the tubular member and said passages, diaphragms within the casing and means operatively connecting the diaphragms with the ends of the brake band.

8. In a pressure operated brake mechanism, the combination with a brake drum and a brake band associated therewith, of a casing disposed between the ends of the band comprising a pair of connected sections each having a laterally extended portion provided with a fluid passage leading to the interior of the casing, a tubular member disposed between the ends of said laterally extended portions, hollow bolts connecting said tubular member with said extended portions and adapted to establish communication between the tubular member and said passages, and a valve carried by said tubular member for closing the passage therethrough.

HENRY L. F. TREBERT.